United States Patent

Nied

Patent Number: 5,275,329
Date of Patent: Jan. 4, 1994

[54] METHOD FOR FIBER REINFORCED COMPOSITE BUTT JOINING

[75] Inventor: Herman A. Nied, Ballston Lake, N.Y.

[73] Assignee: General Electric Company, Schenectady, N.Y.

[21] Appl. No.: 970,756

[22] Filed: Nov. 2, 1992

[51] Int. Cl.⁵ .............................. B23K 33/00
[52] U.S. Cl. .................... 228/120; 228/122; 228/261
[58] Field of Search ............... 228/120, 122, 248, 261, 228/189, 138, 242; 419/47, 48, 49; 264/259, 263, 261, 60; 164/112, 46, 80, 97

[56] References Cited

U.S. PATENT DOCUMENTS

| | | | |
|---|---|---|---|
| 967,163 | 8/1910 | Blaw | 264/261 X |
| 1,935,916 | 11/1933 | Ragsdale | 164/46 X |
| 3,663,723 | 5/1972 | Persson | 228/190 X |
| 4,548,663 | 10/1985 | Worcester | 264/261 X |
| 4,875,616 | 10/1989 | Nixdorf | 228/122 X |
| 4,937,032 | 6/1990 | Krone et al. | 264/259 X |

Primary Examiner—Richard K. Seidel
Assistant Examiner—Jeanne M. Elpel
Attorney, Agent, or Firm—James R McDaniel; Paul R. Webb, II

[57] ABSTRACT

This invention relates to butt joining methods. Such methods of this type, generally, allow fiber reinforced metal matrix composite components having a metal matrix and a fiber reinforcement to be butt joined in order to form a large integral structure.

6 Claims, 1 Drawing Sheet

METHOD FOR FIBER REINFORCED COMPOSITE BUTT JOINING

BACKGROUND OF THE INVENTION

1. Field of the Invention

This invention relates to butt joining methods. Such methods of this type, generally, allow fiber reinforced composite components to be butt joined in order to form a large integral structure.

2. Description of the Related Art

It is well known that the joining of metal matrix composite (MMC) components is difficult due to the interior ceramic reinforcements which may be particles, whiskers or fiber reinforcements. In the case of continuous internal fiber reinforcements, various methods of joining have been attempted. Fusion joining using tungsten inert gas, plasma arc and electron beam processes have been attempted without success. The chief problem with using these processes is that chemical and metallurgical reactions between the metal matrix and the ceramic reinforcement can occur which generate brittle butt welds.

In order to avoid the high temperature reactions, liquid phase interlayer bonding methods have been tried for this type of MMC with limited success. This joining technique which is essentially a brazing process would have limited high temperature applications since the interlayer has a lower melting temperature than the matrix. In addition, it was also found that the interlayer process was only applicable for simple lap joints, but was not well suited for butt joints. Most large structures used at elevated temperature cannot be composed of a series of lap joints and therefore, this type of joint would have limited application. Consequently, it would not be practical to use this type of joint for fiber reinforced MMC composites. Also, fabricating a butt joint with a layer of matrix material or interlayer between the components will not produce a suitable structure. The structure will easily fail in this local zone. Therefore, it is important to develop a joining process that can produce butt joints having a sufficient structural integrity for large structure applications.

It is apparent from the above that there exists a need in the art for a butt joining method which is capable of joining fiber reinforced composite components, and which at least equals the butt joining characteristics of known butt joining methods, but which at the same time can produce butt joints that have sufficient structural integrity for large structural applications. It is a purpose of this invention to fulfill this and other needs in the art in a manner more apparent to the skilled artisan once given the following disclosure.

SUMMARY OF THE INVENTION

Generally speaking, this invention fulfills these needs by providing a method for producing a butt joint between fiber reinforced composite components including a first composite component having first and second ends and a first fiber means located substantially within said first component and extending a predetermined distance away from said first end of said first component and a second composite component having first and second ends and a second fiber means located substantially within said second component and extending a predetermined distance away from said first end of said second component, wherein said method is comprised of the steps of: aligning said first and second components such that said first and second fiber means in said first and second components are aligned along a predetermined geometrical plane and a gap of a predetermined size is created between said first ends of said first and second components; and filling said gap with a material such that a butt joint is formed between said first and second component.

In certain preferred embodiments, the first and second composite components are a matrix constructed of metal and a fiber located within the matrix being constructed of ceramic or metal. Also, the material used to fill the gap may be a base material similar to the metal matrix composite or some other material. Finally, the material is placed within the gap by plasma spraying or a HIP process.

In another further preferred embodiment a butt joint is formed between fiber reinforced composite components such that the butt joints have sufficient structural integrity for large structural applications.

The preferred butt joining method, according to this invention, offers the following advantages: excellent butt joining characteristics; ease of formation of the butt joint; good durability; ability to use fiber reinforced composites; and good economy. In fact, in many of the preferred embodiments these factors of excellent butt joining characteristics, ease of formation of the butt joint and use of fiber reinforced composites are optimized to an extent that is considerably higher than heretofore achieved in prior, known butt joining methods.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which.

DETAILED DESCRIPTION OF THE INVENTION

Figure 1:
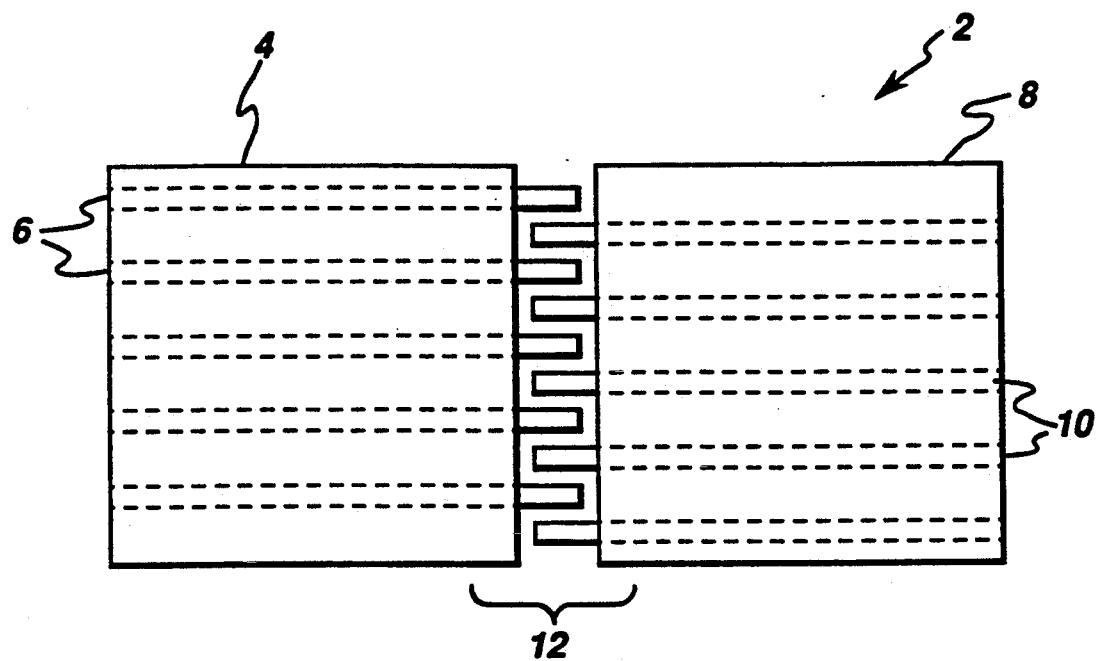
FIG. 1 is a top view of a metal matrix composite (MMC) butt joining system prior to creation of the butt joint, according the present invention.

With reference first to FIG. 1, there is illustrated metal matrix composite (MMC) butt joining system 2. System 2 includes, in part, MMC platelets 4, 8, fibers 6, 10, and gap 12. Platelets 4, 8 are, preferably, constructed of any suitable metal matrix composite. It is to be understood that the present invention could be applied to bars or thick cylindrical shells. Also, other reinforced materials such as polymer composites and concrete reinforced structures can be used. Fibers 6, 10 are, preferably, constructed of any suitable ceramic or metallic material.

Figure 2:
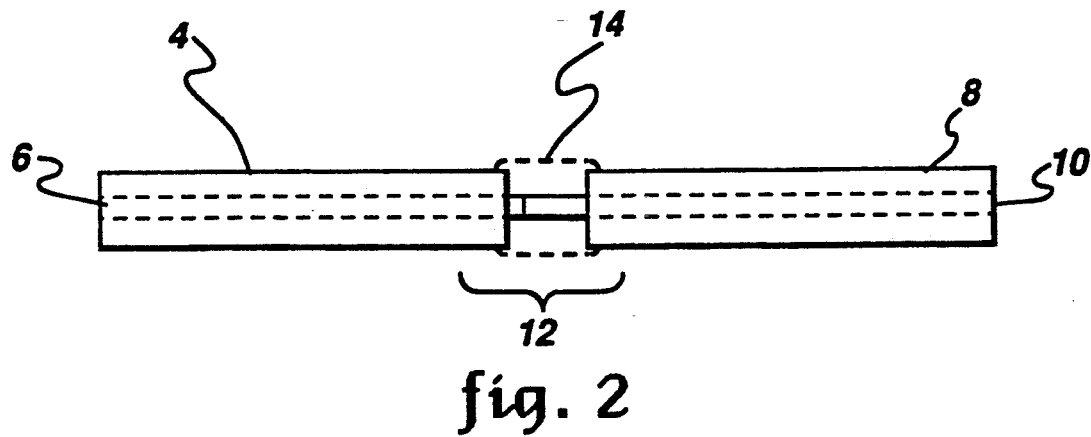
FIG. 2 is a side view of the MMC butt joining system, after the butt joint has been formed, according to the present invention.

With respect to FIG. 2, the production of a MMC butt joint will now be described. Platelets 4, 8 are aligned such that fibers 6 and 10 are located along a geometrical plane as shown in FIG. 2. It is to be noted that fibers 6 and 10 must extend for a predetermined distance beyond platelets 4 and 8, respectively. Platelets 4 and 8 are retained within a conventional fixture (not shown). A gap 12 will now exist between platelets 4, 8 with fibers 6, 10 exposed. The final step in the process is to fill gap 12 by some suitable method to interlock fibers 6, 10 and form a continuous metal matrix joint 14.

Two methods appear feasible to provide this joining method. Plasma spraying the matrix material 14 into gap 12 from both sides to infiltrate the overlapping fibers 6, 10 is the preferred method. The exposed ends could be suitably overcoated to prevent any reactions during the filling of gap 12. If the joint is large, successive passes could be made until the entire gap 12 is filled.

Another potential method to fill gap 12 and produce butt joint 14 would be to use a HIP process. Gap 12 would be filled by extremely fine metal matrix powder followed by performing the HIP process at an elevated temperature to provide a continuous joint 14 without metallurgical reactions between fibers 6, 10 and platelets 4, 8. This type of final butt joint will be continuous and can be tailored to meet structural applications.

It is to be noted that there are several types of geometries and orientations that may been used at the butt joint to provide a secure and sound joint 14. It is well known that terminating any fiber reinforcement in a surrounding matrix of a lower modulus of elasticity will produce a geometric singularity at the edge of the fiber. This occurs in fiber reinforced polymers and leads to eventual failure in the matrix and other fibers. To minimize this effect, the exposed ceramic fibers 6, 10, preferably, can be coated in a manner such that the ends are rounded or a ball end is produced. This will help to anchor the fibers in the gap during the filling process. It is to be understood that the fiber could also be treated to create an end geometry such as a hooked or flanged geometry to facilitate anchoring onto the transition (bond) region. The major feature of the joint formed by the present invention is that it provides a method to produce butt joints for metal matrix composites containing continuous internal ceramic fiber reinforcements by interlocking the fibers at the joint without producing a brittle weld.

Once given the above disclosure, many other features, modifications or improvements will become apparent to the skilled artisan. Such feature, modifications or improvements are, therefore, considered to be a part of this invention, the scope of which is to be determined by the following claims.

What is claimed is:

1. A method for producing a butt joint between metal matrix fiber reinforced composite components including a first composite component having first and second ends and comprising a first metal matrix and a first fiber means located substantially within said first metal matrix and extending a predetermined distance away from said first end of said first component and a second composite component having first and second ends and comprising a second metal matrix and a second fiber means located substantially within said second metal matrix and extending a predetermined distance away from said first end of said second component, wherein said method is comprised of the steps of:

aligning said first and second components such that said first and second fiber means in said first and second components are aligned along a predetermined geometrical plane and a gap of a predetermined size is created between said first ends of said first and second components; and filling said gap with a material such that a butt joint is formed between said first and second components.

2. The method, as in claim 1, wherein said first and second fiber means are further comprised of:

ceramic fibers.

3. The method, as in claim 1, wherein said step of filling said gap with a material is further comprised of the step of:

filling said gap with said material by a plasma spraying process.

4. The method, as in claim 1, wherein said step of filling said gap with a material is further comprised of the step of:

filling said gap with said material by a HIP process.

5. The method, as in claim 1, wherein said method is further comprised of the step of:

surface treating said first and second fibers.

6. The method, as in claim 5, wherein said step of surface treating is further comprised of the step of:

coating said first and second fibers.

* * * * *